US012761795B2

(12) United States Patent
Liu et al.

(10) Patent No.: US 12,761,795 B2
(45) Date of Patent: Oct. 13, 2026

(54) MONITORING MEMORY DEVICE ACCESS STATISTICS

(71) Applicant: Micron Technology, Inc., Boise, ID (US)

(72) Inventors: Chaohui Liu, Shanghai (CN); Ming Ma, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/201,579

(22) Filed: May 7, 2025

(65) Prior Publication Data

US 2025/0362805 A1 Nov. 27, 2025

Related U.S. Application Data

(60) Provisional application No. 63/651,722, filed on May 24, 2024.

(51) Int. Cl.
*G06F 3/06* (2006.01)

(52) U.S. Cl.
CPC ............ *G06F 3/061* (2013.01); *G06F 3/0653* (2013.01); *G06F 3/0673* (2013.01)

(58) Field of Classification Search
CPC ...... G06F 3/061; G06F 3/0653; G06F 3/0659; G06F 3/0673; G06F 3/0679
See application file for complete search history.

(56) References Cited

U.S. PATENT DOCUMENTS

| | | | | |
|---|---|---|---|---|
| 10,397,343 | B1 * | 8/2019 | Goldberg | H04L 67/1097 |
| 2014/0222992 | A1 * | 8/2014 | Goodman | H04L 67/1097<br>709/224 |
| 2019/0129636 | A1 * | 5/2019 | Benisty | G06F 3/0634 |
| 2020/0401515 | A1 * | 12/2020 | Liang | G06F 12/0253 |
| 2021/0349705 | A1 * | 11/2021 | Sasson | G06F 3/0673 |
| 2024/0241656 | A1 * | 7/2024 | Kim | G06F 3/0659 |

* cited by examiner

*Primary Examiner* — Jane W Benner
(74) *Attorney, Agent, or Firm* — Holland & Hart LLP

(57) ABSTRACT

Methods, systems, and devices for monitoring memory device access statistics are described. A host system coupled with a memory system may track and analyze user behavior to determine access parameters associated with the user behavior, and may transmit an indication of the access parameters to the memory system. For example, while in an active mode of the host system, the host system may collect and store metadata associated with access commands issued to the memory system. After transitioning to an idle mode of the host system, the host system may analyze the metadata to generate one or more access parameters associated with access statistics of the access commands, and may transmit an indication of the access parameters to the memory system. The memory system may use the access parameters to modify one or more memory access parameters associated with accessing the memory system.

25 Claims, 4 Drawing Sheets

MONITORING MEMORY DEVICE ACCESS STATISTICS

CROSS REFERENCE

The present application for patent claims priority to U.S. Patent Application No. 63/651,722 by Liu et al., entitled "MONITORING MEMORY DEVICE ACCESS STATISTICS," filed May 24, 2024, which is assigned to the assignee hereof, and which is expressly incorporated by reference in its entirety herein.

TECHNICAL FIELD

The following relates to one or more systems for memory, including monitoring memory device access statistics.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states if disconnected from an external power source.

DETAILED DESCRIPTION

Figure 1:
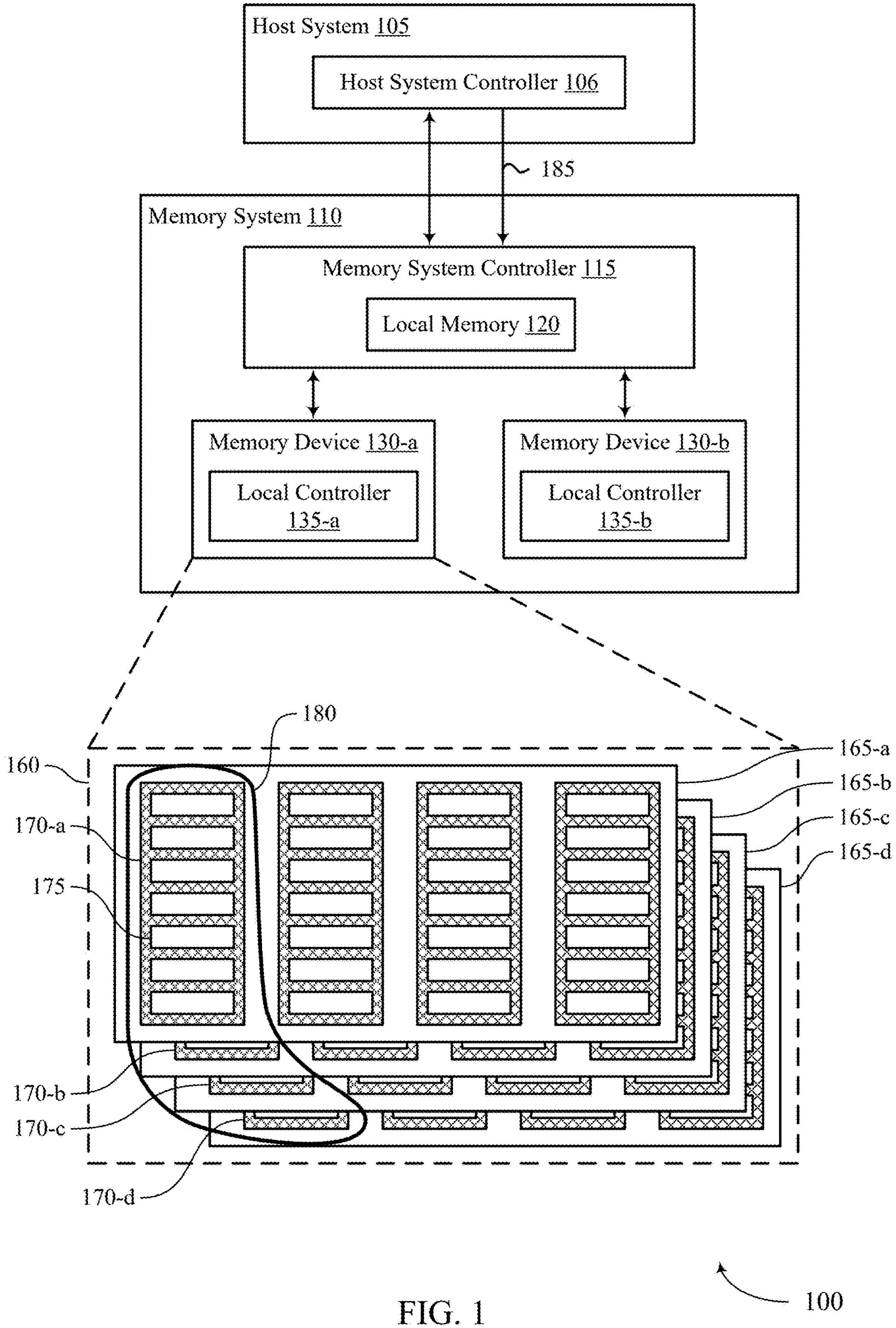
FIG. 1 shows an example of a system that supports monitoring memory device access statistics in accordance with examples as disclosed herein.

Some computing systems, such as mobile devices, may include a host system configured to communicate with a memory system in accordance with a protocol, such as a Universal Flash Storage (UFS) protocol. In some cases, such protocols may allow users (e.g., users of the host system) to access the memory system using a file system, and may be associated with improved performance over other protocols (e.g., may be associated with increased data transfer speeds, decreased latency, decreased power usage, among other benefits). However, such protocols may not provide the memory system the ability to natively track or monitor user behavior. For example, the memory system may not be configured to analyze access commands received from the host system to determine various access parameters. A memory system without access to user behavior may not be able to modify memory access parameters based on the user behavior, which may reduce performance of the memory system.

As described herein, a host system coupled with a memory system may track and analyze user behavior to determine access parameters associated with the user behavior, and may transmit an indication of the access parameters to the memory system. For example, while in an active mode of the host system, the host system may collect and store metadata associated with access commands issued to the memory system. After transitioning to an idle mode of the host system, the host system may analyze the metadata to generate one or more access parameters associated with access statistics of the access commands, and may transmit an indication of the access parameters to the memory system. The memory system may use the access parameters to modify one or more memory access parameters to improve performance associated with accessing the memory system.

In addition to applicability in memory systems as described herein, techniques for monitoring memory device access statistics may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by providing access statistics to a memory system, which may allow the memory system to improve aspects of performance, such as by improving caching performance, improving data relocation efficiency, or the like, which may decrease processing or latency times, improve response times, or otherwise improve user experience, among other benefits.

Features of the disclosure are illustrated and described in the context of systems, devices, and circuits. Features of the disclosure are further illustrated and described in the context of a process flow and flowcharts.

FIG. 1 shows an example of a system 100 that supports monitoring memory device access statistics in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a host system 105 may transmit one or more access parameters 185 to the memory system 110. For example, the host system 105 may track and analyze user behavior to determine access parameters 185 associated with the user behavior, and may transmit an indication of the access parameters 185 to the memory system 110. In some cases, while in an active mode of the host system 105, the host system 105 may collect and store metadata associated with access commands issued to the memory system 110. After transitioning to an idle mode of the host system 105, the host system 105 may analyze the metadata to generate one or more access parameters 185 associated with access statistics of the access commands, and may transmit an indication of the access parameters 185 to the memory system 110. The memory system 110 may use the access parameters to modify one or more memory access parameters to improve performance associated with accessing the memory system 110.

The system 100 may include any quantity of non-transitory computer readable media that support monitoring memory device access statistics. For example, the host system 105 (e.g., a host system controller 106), the memory system 110 (e.g., a memory system controller 115), or a memory device 130 (e.g., a local controller 135), or any combination thereof may include or otherwise may access one or more non-transitory computer readable media storing instructions (e.g., firmware, logic, code) for performing the functions ascribed herein to the host system 105, the memory system 110, or the memory device 130, or combination thereof. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Figure 2A:
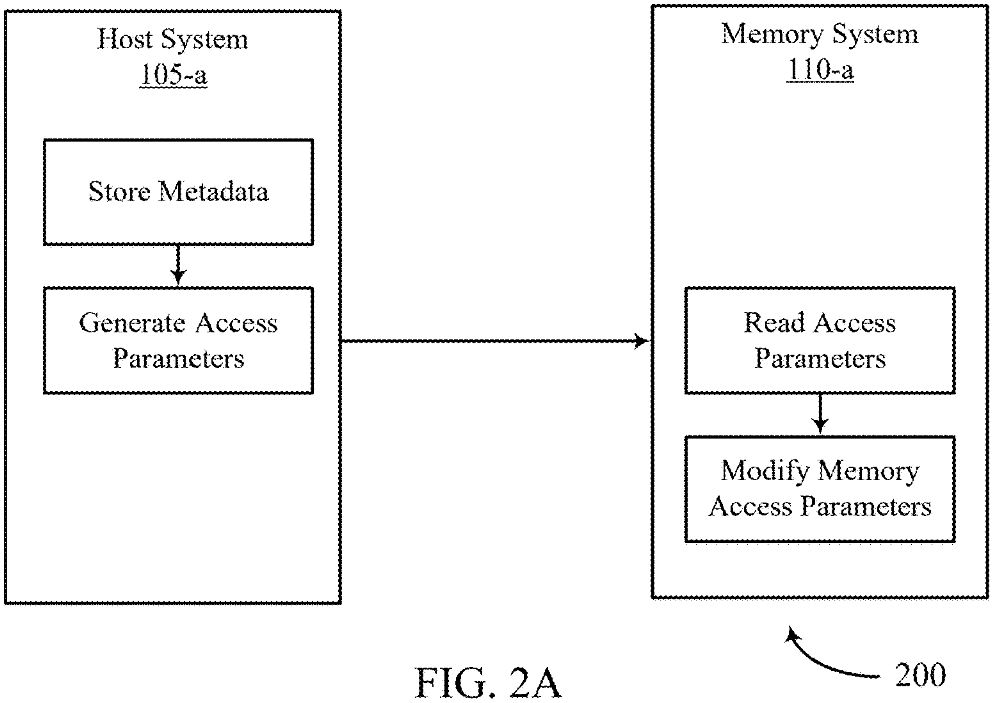
FIGS. 2A and 2B show examples of a system and process that support monitoring memory device access statistics in accordance with examples as disclosed herein.
Figure 2B:
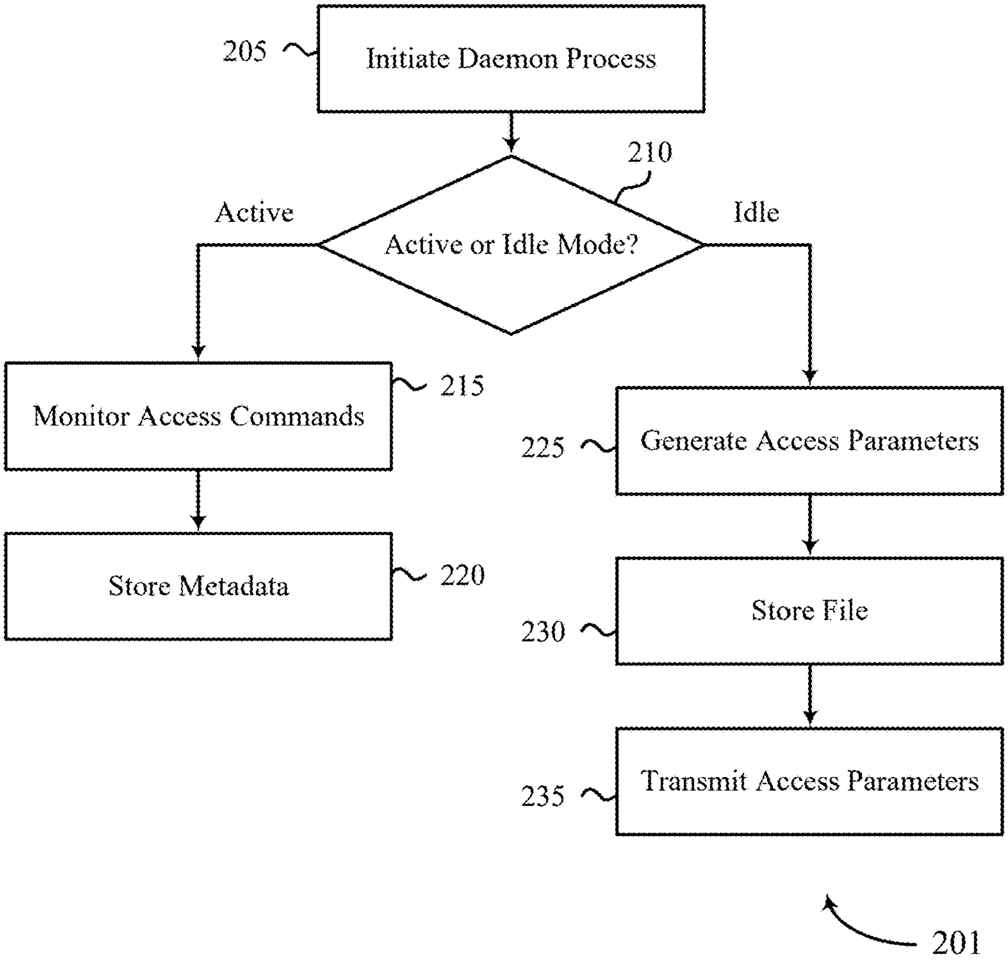

FIGS. 2A and 2B show examples of a system 200 and a process 201, respectively, that support monitoring memory device access statistics in accordance with examples as disclosed herein. The system 200 may include a host system 105-*a* in communication with a memory system 110-*a*, which may both be configured to operate according to the process 201. Aspects of the process 201 may be implemented by processing circuitry, such as one or more controllers, among other components. Additionally, or alternatively, aspects of the process 201 may be implemented as instructions stored in one or more memories (e.g., firmware stored in one or more memories coupled with the host system 105-*a*, the memory system 110-*a*, or both). For example, the instructions, if executed by one or more controllers (e.g., the host system controller 106, the memory system controller 115, or both), may cause the one or more controllers (or a device or a system) to perform the operations of the process 201.

In some cases, the host system 105-*a* and the memory system 110-*a* may be configured to communicate according to a protocol, such as a UFS protocol (e.g., the host system 105-*a* may be a UFS host, and the memory system 110-*a* may be a UFS memory system). In some examples, such protocols may allow users (e.g., users of the host system 105-*a*) to access the memory system 110-*a* in accordance with a file system. For example, the users may view data stored at the memory system 110-*a* in terms of files that include data and a corresponding hierarchical structure of such files. However, such protocols may not provide the memory system 110-*a* the ability to natively track or monitor user behavior. For example, the memory system 110-*a* may not be configured to analyze access commands received from the host system 105-*a* to determine various access parameters. Additionally, or alternatively, the commands from the host system 105-*a* may be grouped or otherwise modified, in some examples, such that the memory system 110-*a* may not determine accurate user behavior.

Techniques descried herein provide for the host system 105-*a* to determine access parameters for the memory system 110-*a* by analyzing access commands issued by the host system 105-*a* to the memory system 110-*a*. The host system 105-*a* may transmit an indication of the access parameters to the memory system 110-*a*. For example, the host system 105-*a* may execute a user application as part of background operations, such as a daemon process, to track one or more access commands issued by the host system 105-*a* to the memory system 110-*a*. At 205, a daemon process (e.g., a background process, job, or other operation not under direct control of a user) may be initiated. For example, a user application executed by the host system 105-*a* may issue a request, such as by issuing a command as part of the daemon process, to monitor access commands issued by the host system 105-*a*.

The daemon process may monitor access commands as part of an active mode of the host system 105-*a*, and may analyze metadata associated with the access commands as part of an idle mode of the host system 105-*a*. For example, at 210, it may be determined whether the host system 105-*a* is operating in an active mode or in an idle mode. If the host system 105-*a* determines that the host system 105-*a* is operating in an active mode, the process 201 may proceed to 215. Alternatively, if the host system 105-*a* determines that the host system 105-*a* is operating in an idle mode, the process 201 may proceed to 225.

In some cases, the active mode and the idle mode may correspond to respective periods of time. For example, the active mode may correspond to a time range in which a user or a device may relatively often (e.g., probably, typically, most of the time) be active, such as during the day or other time periods associated with user activity. The active mode time range may be defined as a duration between an active mode start time and an active mode end time (e.g., in accordance with a clock system of the host system 105-*a*). The idle mode may correspond to a time range in which a user may relatively often (e.g., probably, typically, most of the time) be idle, such as during nighttime or other periods associated with reduced user activity. The idle mode time range may be defined by a duration between the active mode end time and the active mode start time. Alternatively, the time range of idle mode may correspond to a duration between an idle mode start time and an idle mode end time. In some examples, the active mode start time, the active mode end time, the idle mode start time, the idle mode end time, or a combination thereof, may be defined by one or more parameters, such as one or more timestamps, managed by the host system 105-*a*. For example, a user may specify the active mode start time, the active mode end time, the idle mode start time, the idle mode end time, or a combination thereof. Additionally, or alternatively, the one or more parameters may be defined using firmware of the host system 105-*a*, or may be otherwise defined autonomously.

Additionally, or alternatively, the active mode and the idle mode may correspond to states of activity of the host system 105-*a*. For example, the active mode may correspond to a duration in which the host system 105-*a* transmits a relatively large quantity of commands (e.g., a quantity greater than a threshold), and the idle mode may correspond to a duration in which the host system 105-*a* transmits a relatively small quantity of commands (e.g., a quantity less than a threshold).

In response to determining that the host system 105-*a* is operating in the active mode, at 215, one or more access commands may be monitored. For example, the host system 105-*a* may issue one or more access commands to the memory system 110-*a*, and the daemon process may monitor the one or more access commands as they are issued. In some examples, monitoring the access commands may include collecting metadata (e.g., event logs associated with the access commands). The metadata may include information associated with each access command, such as a respective logical address range for each access command, a respective size of data associated with each access command, a respective type of each access command (e.g., a respective indication, such as a flag, of whether an access command is a read command, a write command, or an erase command), a respective timestamp of each access command, or a combination thereof. At 220, the metadata may be stored to the host system 105-*a*. For example, the daemon process may create a file, such as a trace log, that includes the metadata, and may store the file at the host system 105-*a* (e.g., in a volatile memory system included in the host system 105-*a*).

In some examples, the host system 105-*a* may transition from the active mode to the idle mode. For example, a time corresponding to the host system 105-*a* (e.g., an internal clock of the host system 105-*a*) may transition from the time range associated with the active mode to the time range associated with the idle mode, or one or more other parameters may be modified to support the transition between modes.

In response to transitioning to the idle mode, at 225, one or more access parameters associated with the metadata may be generated. For example, the host system 105-*a* may read a file that includes the metadata (e.g., the trace log file stored at 220), and may parse the file to access the metadata. The host system 105-*a* may analyze the metadata to generate one or more access parameters that indicate access statistics of the access commands monitored as part of the active mode. For example, the host system 105-*a* may analyze the metadata to calculate: one or more ranges of logical addresses associated with the access commands, such as a range of commonly accessed logical addresses; a ratio between the quantity of read commands and the quantity of write commands of monitored access commands; a quantity of logical addresses associated with access commands, such as a size of data associated with the access commands (e.g., an average size of data associated with an access command, a most common size of data associated with an access command); or a combination thereof.

At 230, the generated access parameters may be stored to the host system 105-*a* and, at 235, may be transmitted to the memory system 110-*a*. For example, the host system 105-*a* may store the access parameters to a file (e.g., in a volatile memory associated with the host system 105-*a*), and may transmit the file to the memory system 110-*a*. The memory system 110-*a* may receive the access parameters and may use the access parameters to improve various aspects of performance. For example, the memory system 110-*a* may transfer data stored at commonly accessed logical addresses to relatively faster storage (e.g., a cache or buffer), which may improve access speed for the data. Additionally, or alternatively, the memory system 110-*a* may modify memory access parameters based on the ratio between the quantity of read commands and the quantity of write commands of monitored access commands, based on the quantity of logical addresses associated with access commands, or both. In some examples, the memory system 110-*a* may adjust an allocation of different types of memory, such as single-level cell (SLC) memory and multi-level cell (MLC) memory.

Accordingly, after transmitting the file to the memory system 110-*a*, the host system 105-*a* may transmit additional access commands to the memory system 110-*a*, and the memory system 110-*a* may process the additional access commands and access the requested portions of memory using the modified memory access parameters.

Figure 3:
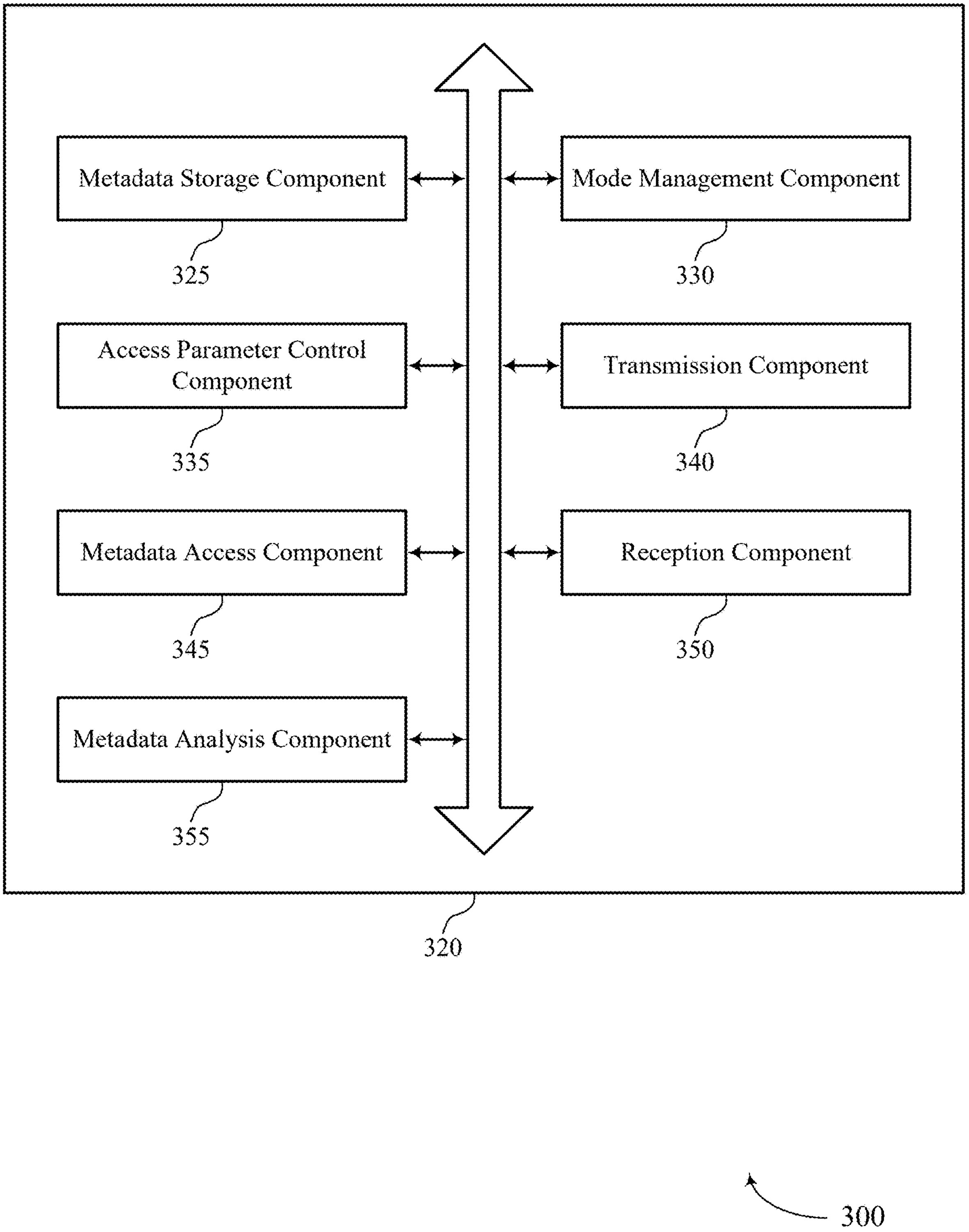
FIG. 3 shows a block diagram of a host system that supports monitoring memory device access statistics in accordance with examples as disclosed herein.

FIG. 3 shows a block diagram 300 of a host system 320 that supports monitoring memory device access statistics in accordance with examples as disclosed herein. The host system 320 may be an example of aspects of a host system as described with reference to FIGS. 1 through 2. The host system 320, or various components thereof, may be an example of means for performing various aspects of monitoring memory device access statistics as described herein. For example, the host system 320 may include a metadata storage component 325, a mode management component 330, an access parameter control component 335, a transmission component 340, a metadata access component 345, a reception component 350, a metadata analysis component 355, or any combination thereof. Each of these components, or components of subcomponents thereof (e.g., one or more processors, one or more memories), may communicate, directly or indirectly, with one another (e.g., via one or more buses).

The metadata storage component 325 may be configured as or otherwise support a means for storing, by the host system operating in an active mode, metadata associated with one or more access commands issued from the host system to a memory system coupled with the host system. The mode management component 330 may be configured as or otherwise support a means for transitioning from the active mode to an idle mode. The access parameter control component 335 may be configured as or otherwise support a means for generating, by the host system operating in the idle mode and based at least in part on the metadata, one or more access parameters associated with the one or more access commands, where the one or more access parameters indicate access statistics associated with the memory system. The transmission component 340 may be configured as or otherwise support a means for transmitting, to the memory system, an indication of the one or more access parameters.

In some examples, to support storing the metadata, the metadata storage component 325 may be configured as or otherwise support a means for storing the metadata in a file at the host system, where the file includes a trace log associated with the one or more access commands. In some examples, to support storing the metadata, the metadata access component 345 may be configured as or otherwise support a means for reading, while operating in the idle mode, the file, where generating the one or more access parameters is based at least in part on reading the file.

In some examples, to support generating the one or more access parameters, the metadata analysis component 355 may be configured as or otherwise support a means for parsing the file to generate the one or more access parameters.

In some examples, the access parameter control component 335 may be configured as or otherwise support a means for storing, by the host system after transitioning to the idle mode, a file including the one or more access parameters based at least in part on generating the one or more access parameters, where transmitting the indication of the one or more access parameters includes transmitting the file to the memory system.

In some examples, the reception component 350 may be configured as or otherwise support a means for receiving, from a user application executed by the host system, a request to monitor the one or more access commands, where storing the metadata is based at least in part on receiving the request.

In some examples, the transmission component 340 may be configured as or otherwise support a means for transmitting one or more second access commands to the memory system, where the memory system performs the one or more second access commands according to memory access parameters that are modified based at least in part on the one or more access parameters.

In some examples, to support transitioning from the active mode to the idle mode, the mode management component 330 may be configured as or otherwise support a means for transitioning from the active mode to the idle mode based at least in part on determining that a current time is in a second periodic time period associated with the idle mode, where the active mode is associated with a first periodic time period.

In some examples, to support generating the one or more access parameters, the access parameter control component 335 may be configured as or otherwise support a means for generating the one or more access parameters including one or more ranges of logical addresses associated with the one or more access commands, a ratio between one or more read commands of the one or more access commands and one or more write commands of the one or more access commands, a quantity of logical addresses associated with the one or more access commands, or a combination thereof.

In some examples, the transmission component 340 may be configured as or otherwise support a means for issuing the one or more access commands to the memory system, where storing the metadata at the host system is based at least in part on issuing the one or more access commands.

In some examples, the host system and the memory system are configured to communicate according to a Universal Flash Storage (UFS) protocol.

In some examples, the described functionality of the host system 320, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the host system 320, or various components thereof, may be implemented at least in part by instructions (e.g., stored in memory, non-transitory computer-readable medium) executable by such at least one processor.

Figure 4:
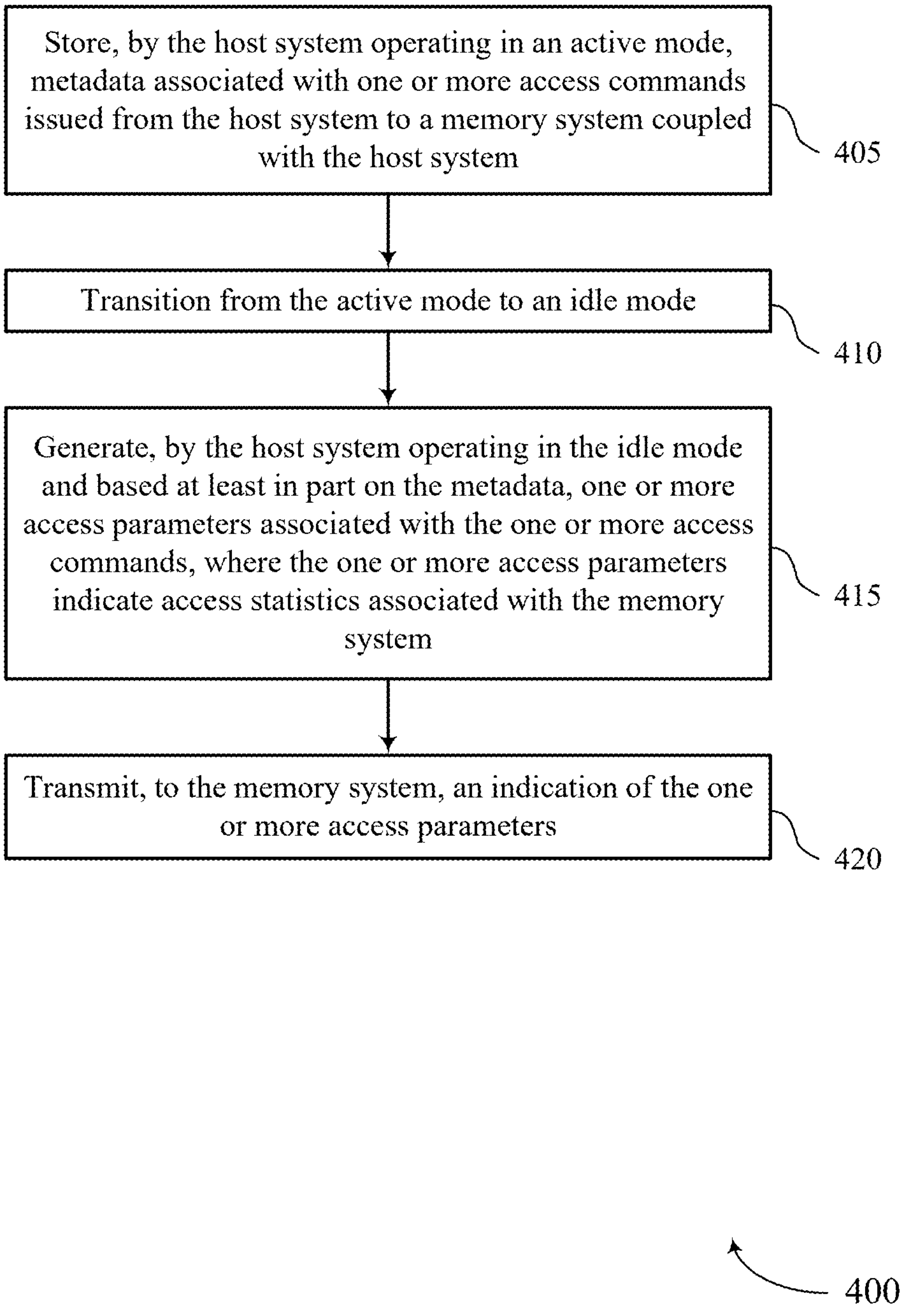
FIG. 4 shows a flowchart illustrating a method that supports monitoring memory device access statistics in accordance with examples as disclosed herein.

FIG. 4 shows a flowchart illustrating a method 400 that supports monitoring memory device access statistics in accordance with examples as disclosed herein. The operations of method 400 may be implemented by a host system or its components as described herein. For example, the operations of method 400 may be performed by a host system as described with reference to FIGS. 1 through 3. In some examples, a host system may execute a set of instructions to control the functional elements of the device to perform the described functions. Additionally, or alternatively, the host system may perform aspects of the described functions using special-purpose hardware.

At 405, the method may include storing, by the host system operating in an active mode, metadata associated with one or more access commands issued from the host system to a memory system coupled with the host system. In some examples, aspects of the operations of 405 may be performed by a metadata storage component 325 as described with reference to FIG. 3.

At 410, the method may include transitioning from the active mode to an idle mode. In some examples, aspects of the operations of 410 may be performed by a mode management component 330 as described with reference to FIG. 3.

At 415, the method may include generating, by the host system operating in the idle mode and based at least in part on the metadata, one or more access parameters associated with the one or more access commands, where the one or more access parameters indicate access statistics associated with the memory system. In some examples, aspects of the operations of 415 may be performed by an access parameter control component 335 as described with reference to FIG. 3.

At 420, the method may include transmitting, to the memory system, an indication of the one or more access parameters. In some examples, aspects of the operations of 420 may be performed by a transmission component 340 as described with reference to FIG. 3.

In some examples, an apparatus as described herein may perform a method or methods, such as the method 400. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for storing, by the host system operating in an active mode, metadata associated with one or more access commands issued from the host system to a memory system coupled with the host system; transitioning from the active mode to an idle mode; generating, by the host system operating in the idle mode and based at least in part on the metadata, one or more access parameters associated with the one or more access commands, where the one or more access parameters indicate access statistics associated with the memory system; and transmitting, to the memory system, an indication of the one or more access parameters.

Aspect 2: The method, apparatus, or non-transitory computer-readable medium of aspect 1, where storing the metadata includes operations, features, circuitry, logic, means, or instructions, or any combination thereof for storing the metadata in a file at the host system, where the file includes a trace log associated with the one or more access commands and reading, while operating in the idle mode, the file, where generating the one or more access parameters is based at least in part on reading the file.

Aspect 3: The method, apparatus, or non-transitory computer-readable medium of aspect 2, where generating the one or more access parameters includes operations, features, circuitry, logic, means, or instructions, or any combination thereof for parsing the file to generate the one or more access parameters.

Aspect 4: The method, apparatus, or non-transitory computer-readable medium of any of aspects 1 through 3, further including operations, features, circuitry, logic, means, or instructions, or any combination thereof for storing, by the host system after transitioning to the idle mode, a file including the one or more access parameters based at least in part on generating the one or more access parameters, where transmitting the indication of the one or more access parameters includes transmitting the file to the memory system.

Aspect 5: The method, apparatus, or non-transitory computer-readable medium of any of aspects 1 through 4, further including operations, features, circuitry, logic, means, or instructions, or any combination thereof for receiving, from a user application executed by the host system, a request to monitor the one or more access commands, where storing the metadata is based at least in part on receiving the request.

Aspect 6: The method, apparatus, or non-transitory computer-readable medium of any of aspects 1 through 5, further including operations, features, circuitry, logic, means, or instructions, or any combination thereof for transmitting one or more second access commands to the memory system, where the memory system performs the one or more second access commands according to memory access parameters that are modified based at least in part on the one or more access parameters.

Aspect 7: The method, apparatus, or non-transitory computer-readable medium of any of aspects 1 through 6, where transitioning from the active mode to the idle mode includes operations, features, circuitry, logic, means, or instructions, or any combination thereof for transitioning from the active mode to the idle mode based at least in part on determining that a current time is in a second periodic time period associated with the idle mode, where the active mode is associated with a first periodic time period.

Aspect 8: The method, apparatus, or non-transitory computer-readable medium of any of aspects 1 through 7, where generating the one or more access parameters includes operations, features, circuitry, logic, means, or instructions, or any combination thereof for generating the one or more access parameters including one or more ranges of logical addresses associated with the one or more access commands, a ratio between one or more read commands of the one or more access commands and one or more write commands of the one or more access commands, a quantity of logical addresses associated with the one or more access commands, or a combination thereof.

Aspect 9: The method, apparatus, or non-transitory computer-readable medium of any of aspects 1 through 8, further including operations, features, circuitry, logic, means, or instructions, or any combination thereof for issuing the one or more access commands to the memory system, where storing the metadata at the host system is based at least in part on issuing the one or more access commands.

Aspect 10: The method, apparatus, or non-transitory computer-readable medium of any of aspects 1 through 9, where the host system and the memory system are configured to communicate according to a Universal Flash Storage (UFS) protocol.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A host system, comprising:

one or more interfaces comprising one or more signal paths operable for communications with one or more memory systems; and processing circuitry coupled with the one or more interfaces and configured to cause the host system to:

store, while operating in an active mode, metadata associated with one or more access commands issued from the host system to a memory system of the one or more memory systems coupled with the host system;

transition from the active mode to an idle mode;

generate, while operating in the idle mode and based at least in part on the metadata, one or more access parameters associated with the one or more access commands, wherein the one or more access parameters indicate access statistics associated with the memory system; and transmit an indication of the one or more access parameters.

2. The host system of claim 1, wherein, to store the metadata, the processing circuitry is further configured to cause the host system to:

store the metadata in a file at the host system, wherein the file comprises a trace log associated with the one or more access commands; and read, while operating in the idle mode, the file, wherein generating the one or more access parameters is based at least in part on reading the file.

3. The host system of claim 2, wherein, to generate the one or more access parameters, the processing circuitry is further configured to cause the host system to:

parse the file to generate the one or more access parameters.

4. The host system of claim 1, wherein the processing circuitry is further configured to cause the host system to:

store, after transitioning to the idle mode, a file comprising the one or more access parameters based at least in part on generating the one or more access parameters, wherein transmitting the indication of the one or more access parameters comprises transmitting the file to the memory system.

5. The host system of claim 1, wherein the processing circuitry is further configured to cause the host system to:

receive, from a user application executed by the host system, a request to monitor the one or more access commands, wherein storing the metadata is based at least in part on receiving the request.

6. The host system of claim 1, wherein the processing circuitry is further configured to cause the host system to:

transmit one or more second access commands, wherein the memory system performs the one or more second access commands according to memory access parameters that are modified based at least in part on the one or more access parameters.

7. The host system of claim 1, wherein, to transition from the active mode to the idle mode, the processing circuitry is further configured to cause the host system to:

transition from the active mode to the idle mode based at least in part on determining that a current time is in a second periodic time period associated with the idle mode, wherein the active mode is associated with a first periodic time period.

8. The host system of claim 1, wherein, to generate the one or more access parameters, the processing circuitry is further configured to cause the host system to:

generate the one or more access parameters including one or more ranges of logical addresses associated with the one or more access commands, a ratio between one or more read commands of the one or more access commands and one or more write commands of the one or more access commands, a quantity of logical addresses associated with the one or more access commands, or a combination thereof.

9. The host system of claim 1, wherein the processing circuitry is further configured to cause the host system to:

issue the one or more access commands, wherein storing the metadata at the host system is based at least in part on issuing the one or more access commands.

10. The host system of claim 1, wherein the host system and the memory system are configured to communicate according to a Universal Flash Storage (UFS) protocol.

11. A non-transitory computer-readable medium storing code, the code comprising instructions executable by one or more processors to:

store, by a host system operating in an active mode, metadata associated with one or more access commands issued from the host system to a memory system coupled with the host system;

transition from the active mode to an idle mode;

generate, by the host system operating in the idle mode and based at least in part on the metadata, one or more access parameters associated with the one or more access commands, wherein the one or more access parameters indicate access statistics associated with the memory system; and transmit, to the memory system, an indication of the one or more access parameters.

12. The non-transitory computer-readable medium of claim 11, wherein the instructions to store the metadata are executable by the one or more processors to:

store the metadata in a file at the host system, wherein the file comprises a trace log associated with the one or more access commands; and read, while operating in the idle mode, the file, wherein generating the one or more access parameters is based at least in part on reading the file.

13. The non-transitory computer-readable medium of claim 12, wherein the instructions to generate the one or more access parameters are executable by the one or more processors to:

parse the file to generate the one or more access parameters.

14. The non-transitory computer-readable medium of claim 11, wherein the instructions are further executable by the one or more processors to:

store, by the host system after transitioning to the idle mode, a file comprising the one or more access parameters based at least in part on generating the one or more access parameters, wherein transmitting the indication of the one or more access parameters comprises transmitting the file to the memory system.

15. The non-transitory computer-readable medium of claim 11, wherein the instructions are further executable by the one or more processors to:

receive, from a user application executed by the host system, a request to monitor the one or more access commands, wherein storing the metadata is based at least in part on receiving the request.

16. The non-transitory computer-readable medium of claim 11, wherein the instructions are further executable by the one or more processors to:

transmit one or more second access commands to the memory system, wherein the memory system performs the one or more second access commands according to memory access parameters that are modified based at least in part on the one or more access parameters.

17. The non-transitory computer-readable medium of claim 11, wherein the instructions to transition from the active mode to the idle mode are executable by the one or more processors to:

transition from the active mode to the idle mode based at least in part on determining that a current time is in a second periodic time period associated with the idle mode, wherein the active mode is associated with a first periodic time period.

18. The non-transitory computer-readable medium of claim 11, wherein the instructions to generate the one or more access parameters are executable by the one or more processors to:

generate the one or more access parameters including one or more ranges of logical addresses associated with the one or more access commands, a ratio between one or more read commands of the one or more access commands and one or more write commands of the one or more access commands, a quantity of logical addresses associated with the one or more access commands, or a combination thereof.

19. The non-transitory computer-readable medium of claim 11, wherein the instructions are further executable by the one or more processors to:

issue the one or more access commands to the memory system, wherein storing the metadata at the host system is based at least in part on issuing the one or more access commands.

20. The non-transitory computer-readable medium of claim 11, wherein the host system and the memory system are configured to communicate according to a Universal Flash Storage (UFS) protocol.

21. A method of a host system, comprising:

storing, by the host system operating in an active mode, metadata associated with one or more access commands issued from the host system to a memory system coupled with the host system;

transitioning from the active mode to an idle mode;

generating, by the host system operating in the idle mode and based at least in part on the metadata, one or more access parameters associated with the one or more access commands, wherein the one or more access parameters indicate access statistics associated with the memory system; and transmitting, to the memory system, an indication of the one or more access parameters.

22. The method of claim 21, wherein storing the metadata comprises:

storing the metadata in a file at the host system, wherein the file comprises a trace log associated with the one or more access commands; and reading, while operating in the idle mode, the file, wherein generating the one or more access parameters is based at least in part on reading the file.

23. The method of claim 22, wherein generating the one or more access parameters comprises:

parsing the file to generate the one or more access parameters.

24. The method of claim 21, further comprising:

storing, by the host system after transitioning to the idle mode, a file comprising the one or more access parameters based at least in part on generating the one or more access parameters, wherein transmitting the indication of the one or more access parameters comprises transmitting the file to the memory system.

25. The method of claim 21, further comprising:

receiving, from a user application executed by the host system, a request to monitor the one or more access commands, wherein storing the metadata is based at least in part on receiving the request.

* * * * *